US008266882B2

(12) United States Patent
Hermey et al.

(10) Patent No.: US 8,266,882 B2
(45) Date of Patent: Sep. 18, 2012

(54) CABLE GUIDE

(75) Inventors: Andreas Hermey, Hennef (DE); Frank Blase, Bergisch Gladbach (DE); Ralf Steeger, Lohmar (DE)

(73) Assignee: Igus GmbH, Cologne (DE)

( * ) Notice: Subject to any disclaimer, the term of this patent is extended or adjusted under 35 U.S.C. 154(b) by 238 days.

(21) Appl. No.: 12/760,834

(22) Filed: Apr. 15, 2010

(65) Prior Publication Data

US 2010/0275570 A1 Nov. 4, 2010

(30) Foreign Application Priority Data

Apr. 16, 2009 (DE) .................... 20 2009 005 546 U

(51) Int. Cl.
*F16G 13/16* (2006.01)
*H02G 3/04* (2006.01)

(52) U.S. Cl. .................. 59/78.1; 59/80; 248/49; 248/51

(58) Field of Classification Search .................... 59/78.1, 59/80; 248/49, 51
See application file for complete search history.

(56) References Cited

U.S. PATENT DOCUMENTS

| 5,824,957 | A | * | 10/1998 | Holshausen | ............... | 59/78.1 |
| 6,321,524 | B1 | * | 11/2001 | Bro | ............... | 248/49 |
| 7,272,922 | B2 | * | 9/2007 | Fahrion | ............... | 59/78.1 |
| 7,278,253 | B2 | | 10/2007 | Wehler et al. | | |
| 7,484,351 | B2 | | 2/2009 | Harada et al. | | |
| 7,584,597 | B2 | * | 9/2009 | Blase et al. | ............... | 248/49 |
| 2002/0038718 | A1 | | 4/2002 | Gianfranchi | | |
| 2006/0260833 | A1 | | 11/2006 | Blase et al. | | |

FOREIGN PATENT DOCUMENTS

| DE | 197 16 695 | 12/1998 |
| DE | 203 05 487 | 7/2003 |
| DE | 102006030086 | 1/2008 |
| EP | 1193819 | 4/2002 |
| EP | 1 616 376 | 10/2006 |
| EP | 1 714 751 | 10/2006 |

OTHER PUBLICATIONS

German Search Report dated Dec. 9, 2009 received in corresponding priority Application No. 20 2009 005 546.9.
PCT International Search Report dated Aug. 4, 2011, received in corresponding PCT Application No. PCT/EP2010/054928.
PCT International Preliminary Examination Report received in corresponding PCT Application No. PCT/EP2010/054928.

\* cited by examiner

*Primary Examiner* — David B Jones
(74) *Attorney, Agent, or Firm* — Grossman Tucker Perreault & Pfleger, PLLC

(57) ABSTRACT

A cable guide (10), having articulated links (12), capable of angling in two directions, and open on an face end, and arranged one behind the other in a longitudinal direction and forming a guide channel (16) by means of external guide elements; joints absorbing tensile forces are located between two connected links, and the links (12) each display corresponding connecting elements (18) with two connecting components (20, 22). The first component (20) of the connecting element (18) is fork-shaped, where the second connecting component displays a first seat (32) with a spherical boundary, in which a joint element (34), having an opening (36) and a spherical outer boundary (35) adapted to the first seat, is moveable, and the second component with a joint element (34) can be positioned between the two legs of the first component in a way that the opening (36) in the joint element with a spherical outer boundary is aligned with an opening (27, 28) provided in each of the two legs (24, 26).

15 Claims, 10 Drawing Sheets

CABLE GUIDE

The invention relates to a cable guide.

A cable guide is known from EP 1616376 B1. The cable guide described therein is provided with a connecting system displaying a ball and a correspondingly shaped socket. For handling, especially for connecting the individual links of the cable guide, the parts have to be pivoted through an angle of 90° to the longitudinal axis of the cable guide. This can lead to rather awkward handling in the case of cable guides, energy guiding chains, etc. with a relatively large diameter.

The object of the invention is therefore to design a cable guide, energy chain or similar in such a way that, with a simple arrangement and configuration of the connecting components, it is easy to handle during assembly and disassembly. Virtually cardanic pivoting of the individual links relative to each other is to be possible in this context.

This object is solved by the teaching of a cable guide herein, consisting of links, connected to each other in articulated fashion, capable of angling in at least two directions relative to each other, and open on a face end, which are arranged behind each other in a longitudinal direction of the cable guide and form at least one guide channel by means of external guide elements, wherein a joint is located between two of the connected links within the cable guide, and wherein each of the two connected links has a corresponding connecting element having first and second connecting components, characterized in that the first connecting component of the connecting element is a fork-shaped design having two legs a distance apart from each other and each leg having an opening therein, and the second connecting component has a first seat having a spherical boundary surface and a joint element having an opening and a spherical outer boundary surface adapted to the spherical boundary surface of the first seat, wherein the joint element is mounted in the first seat in moveable fashion, and the second component having the joint element located therein can be positioned between the two legs of the first component in such a way that the opening in the joint element is aligned with the opening provided in each of the two legs of the first connecting component, such that a pin is insertable into a second seat formed by the openings in the two legs of the first component and the opening in the joint element of the second component, and is mounted in the second seat.

The individual components consist entirely or predominantly of plastic and can be produced using known manufacturing methods. In addition, the elasticity inherent in the customary plastics can also be exploited here to simplify handling, e.g. in that use is made of easily makable and breakable snap connections.

Further embodiments of the invention are indicated in the sub-claims.

Figure 1:
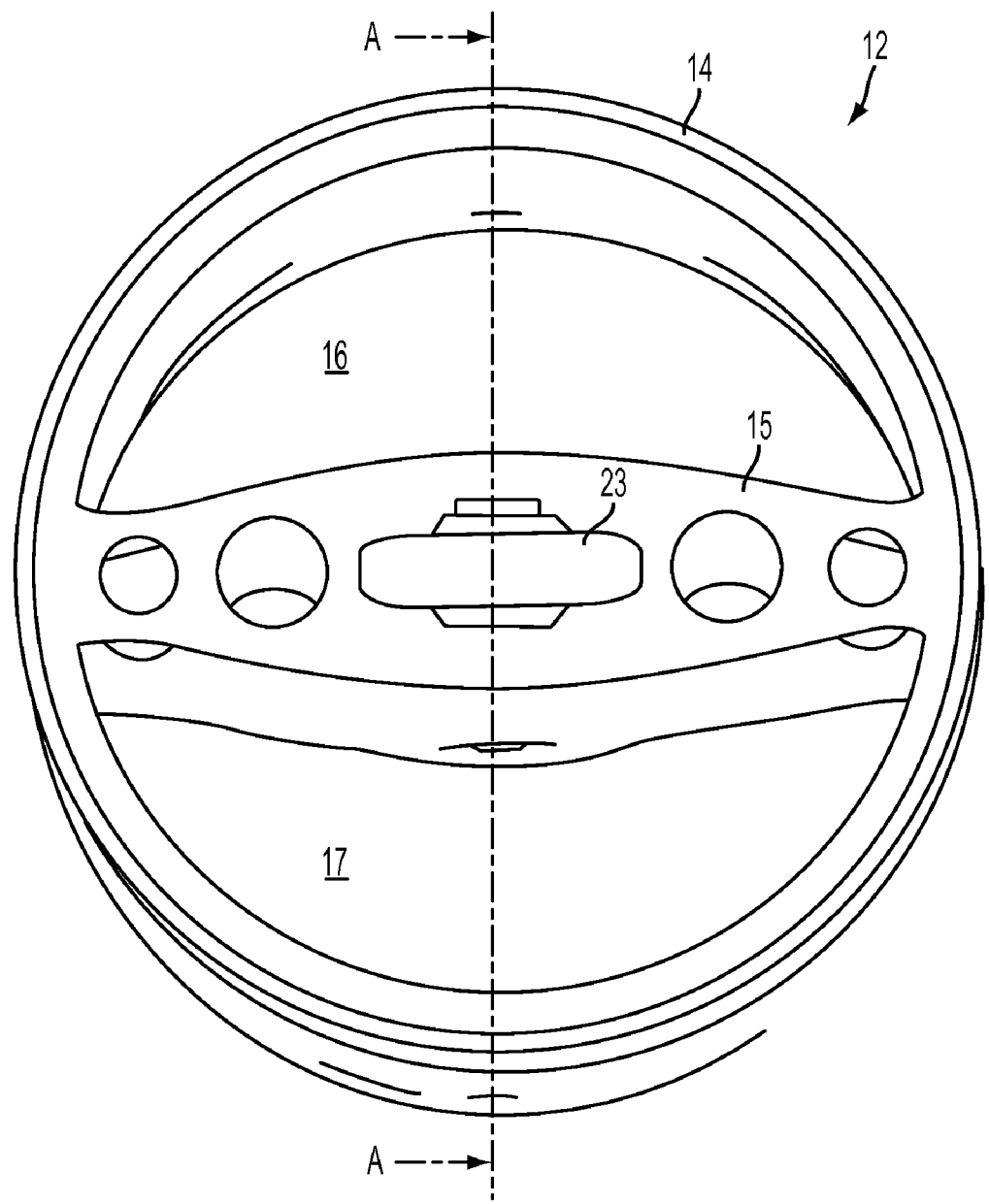
Figure 2:
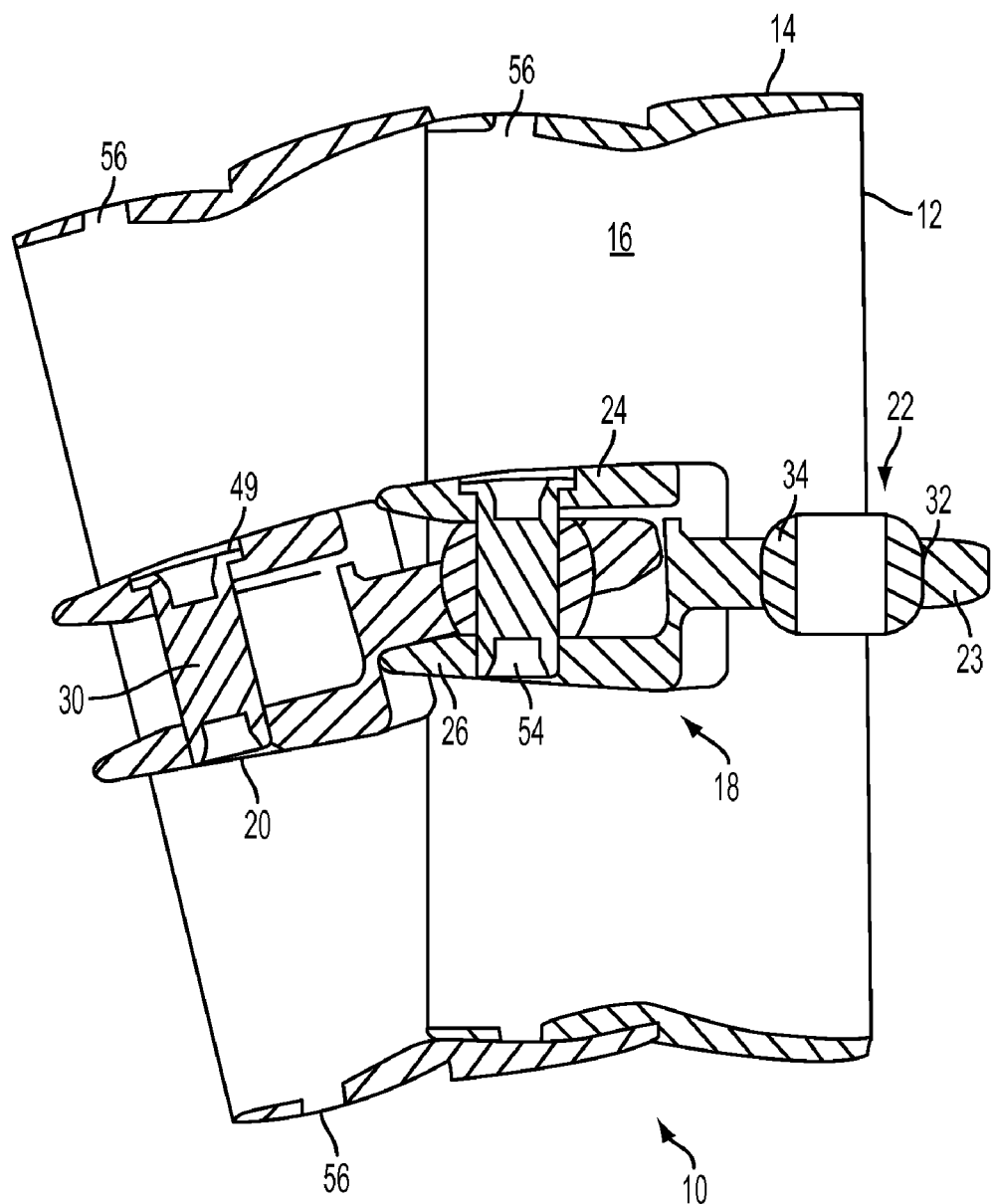
Figure 3:
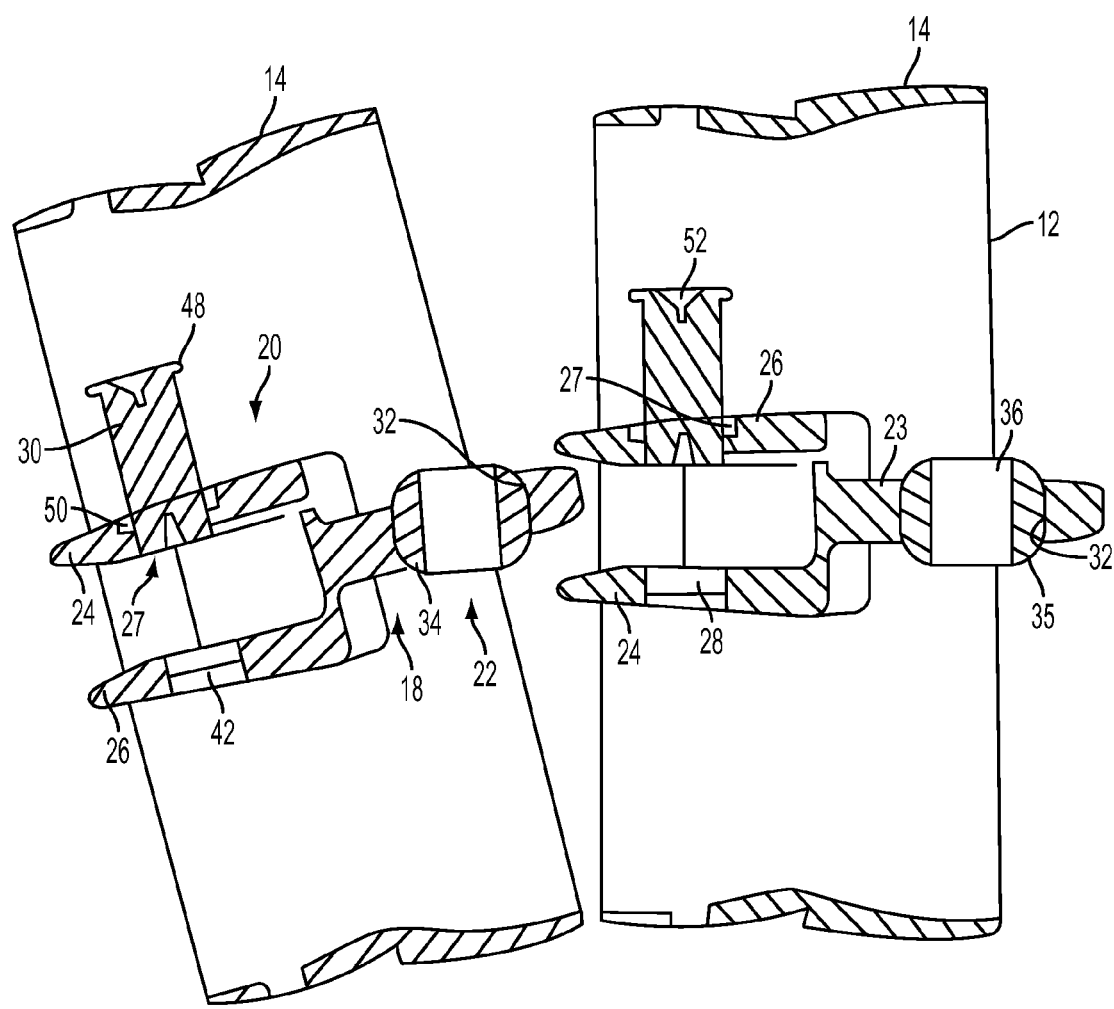
Figure 4:
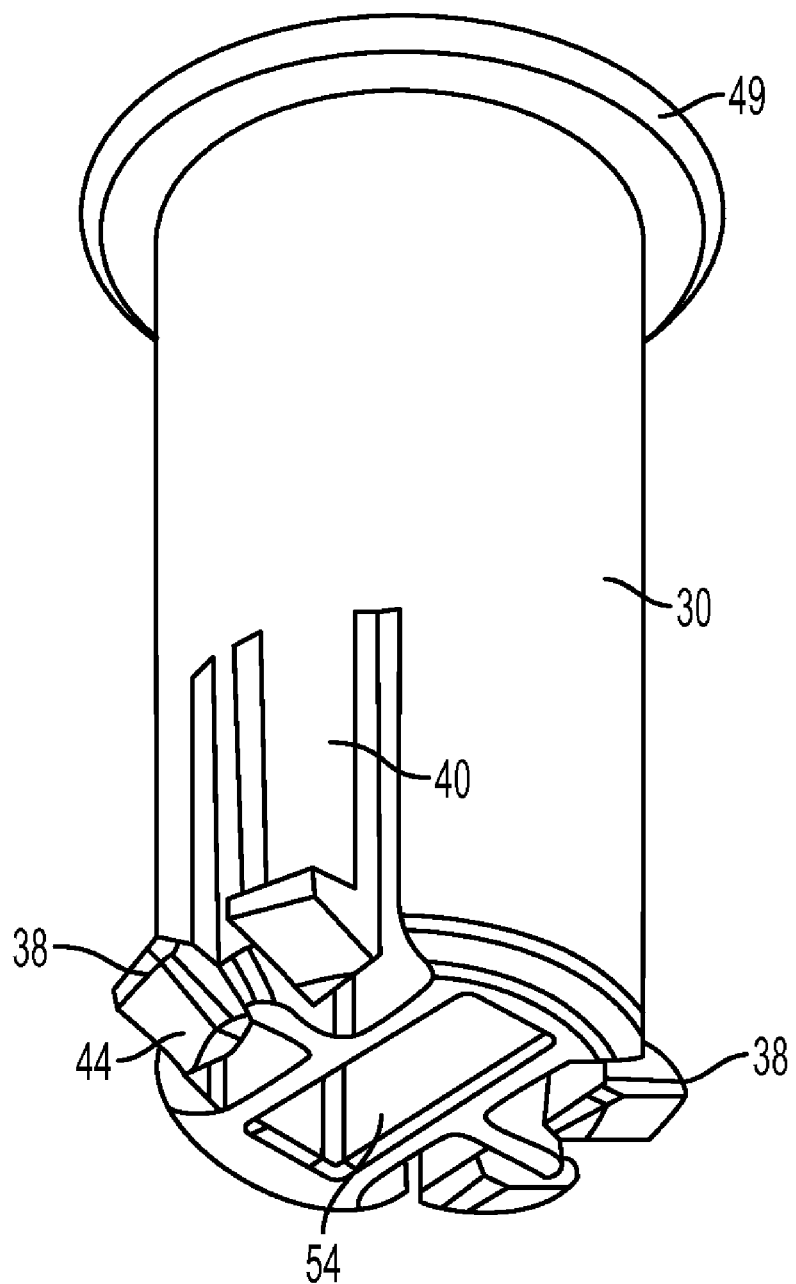
Figure 5:
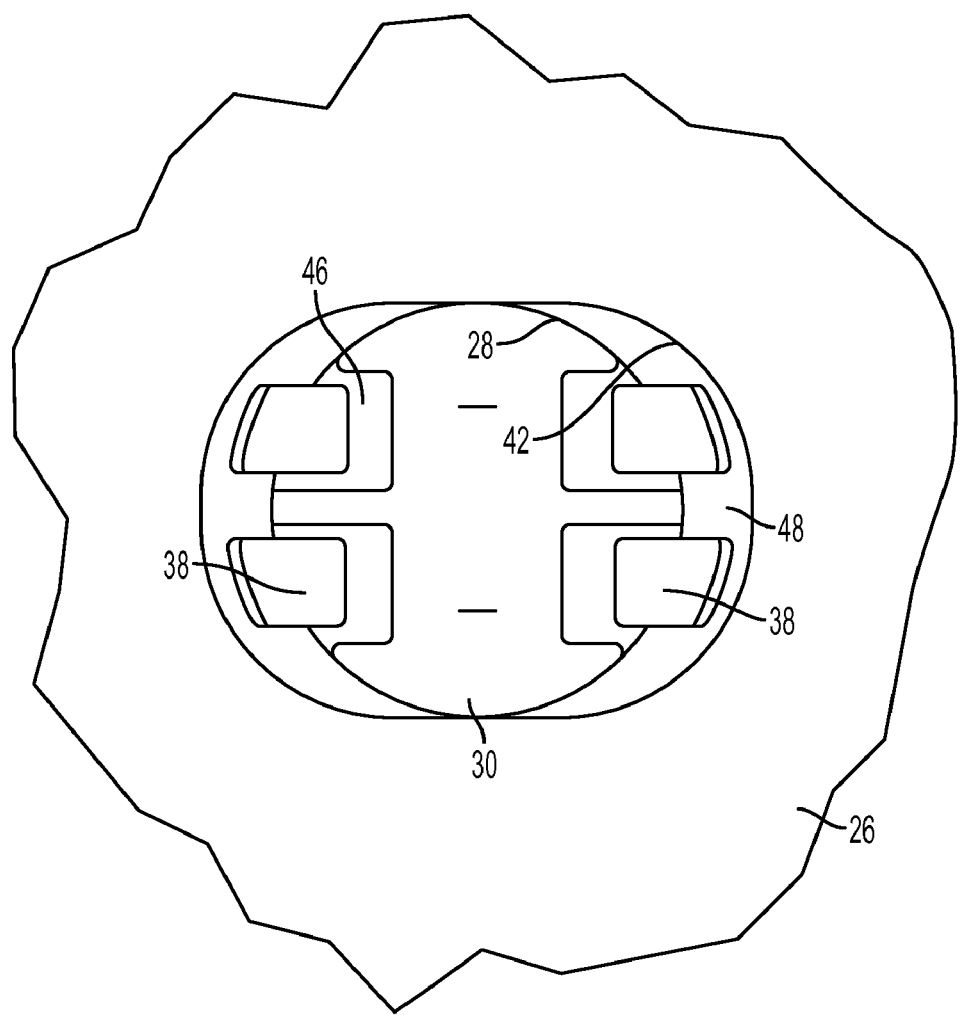
Figure 6:
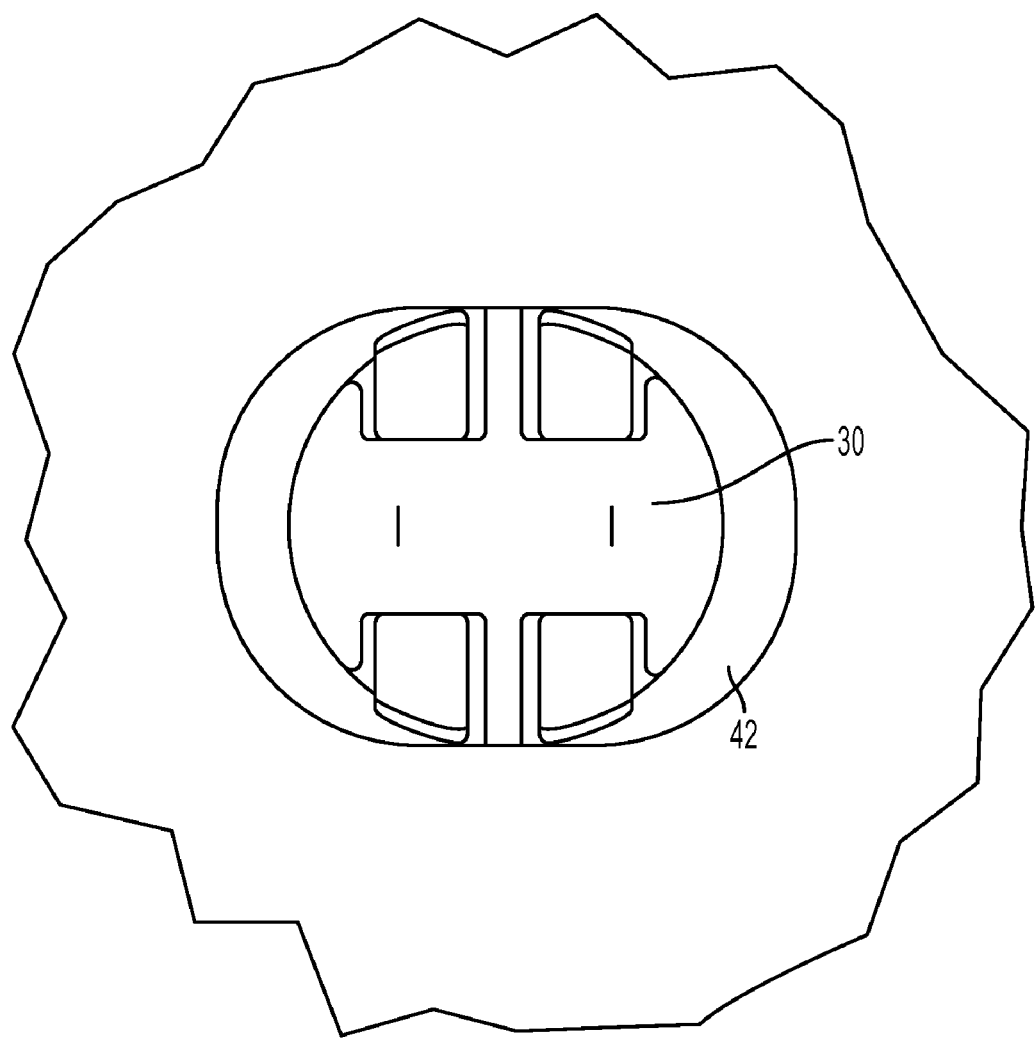
Figure 8:
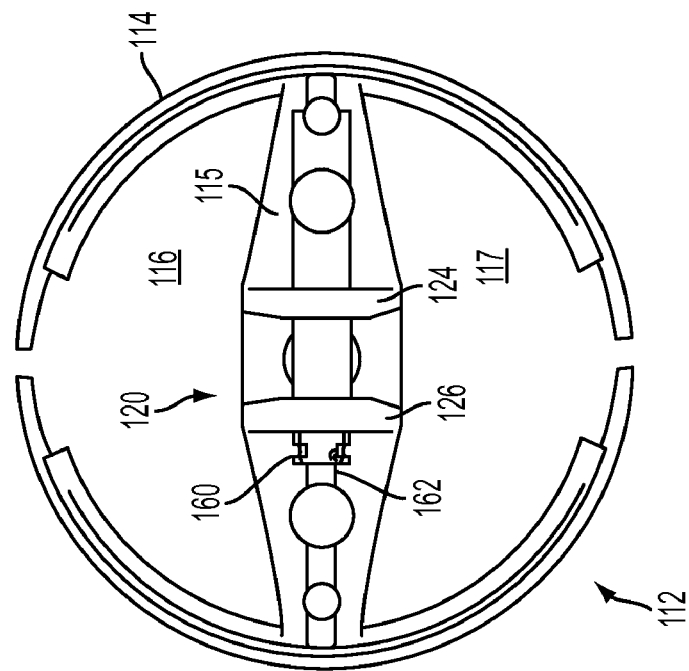
Figure 7:
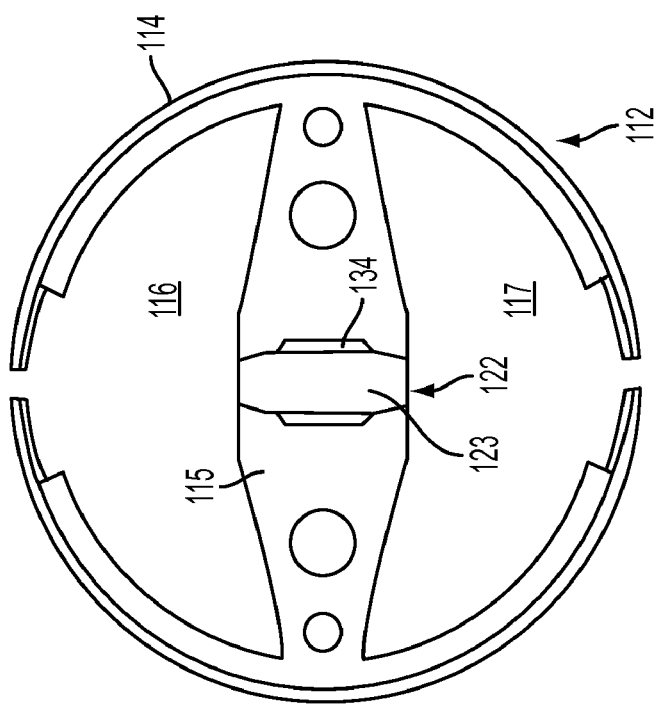
Figure 9:
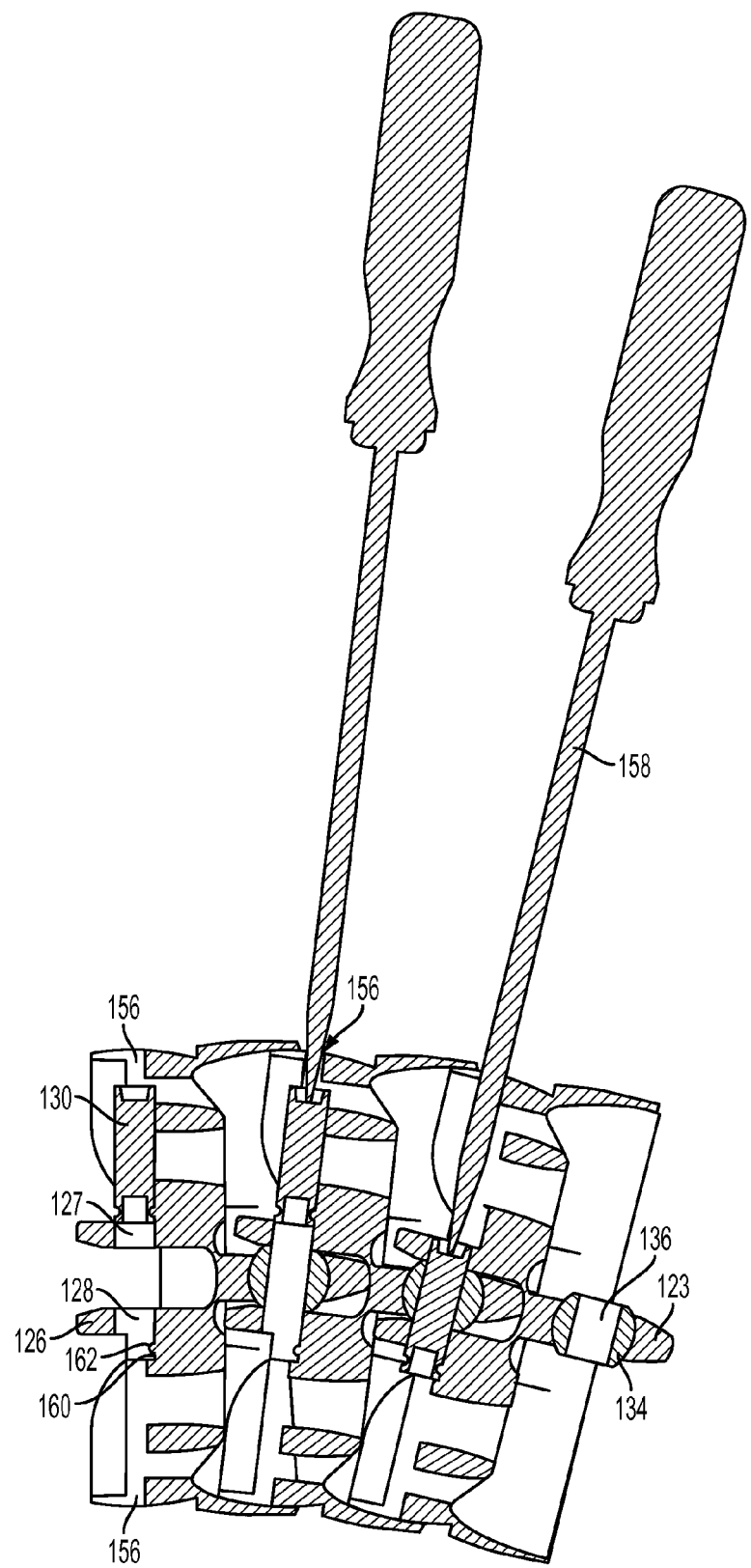
Figure 10:
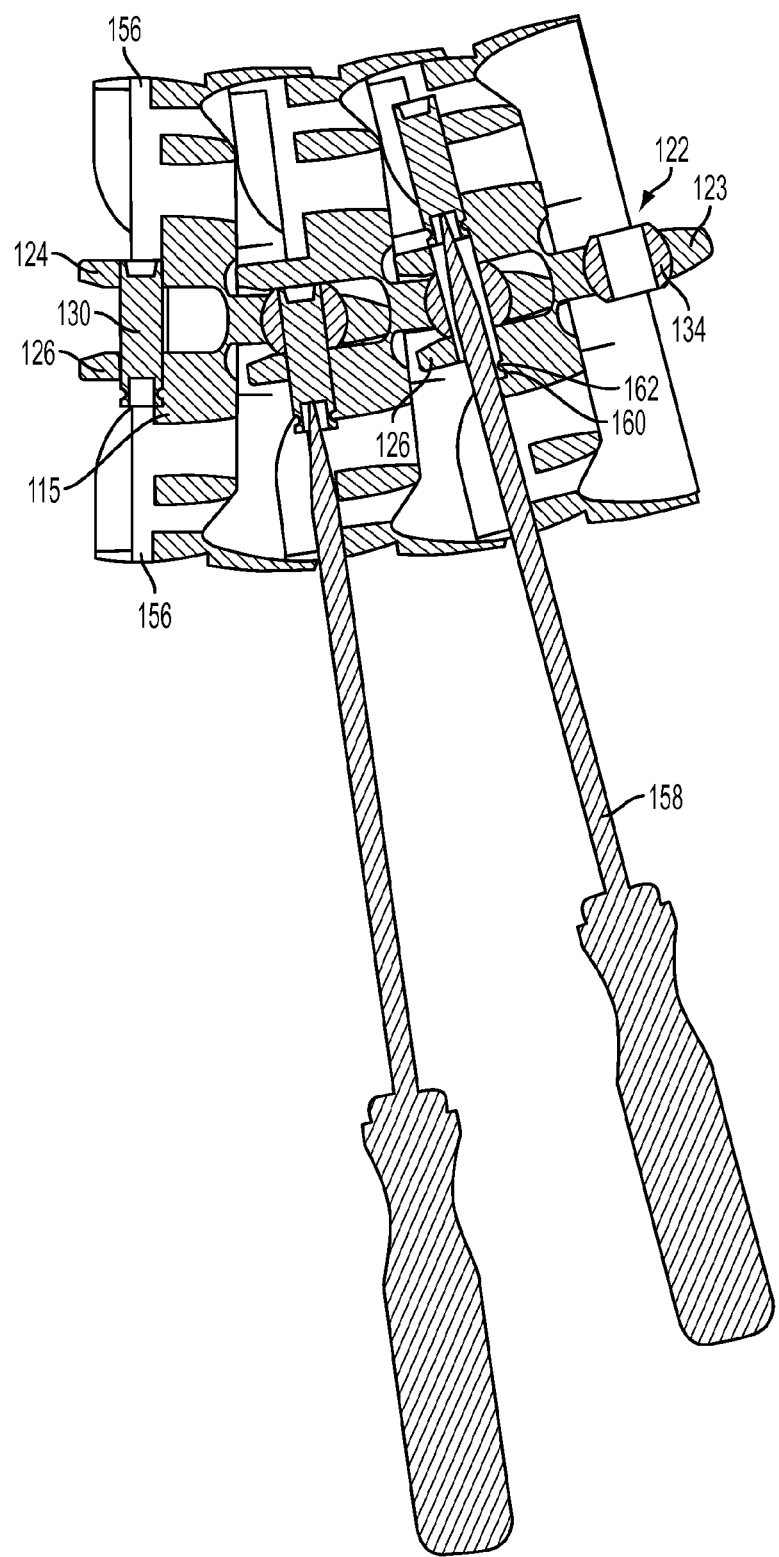
Figure 12:
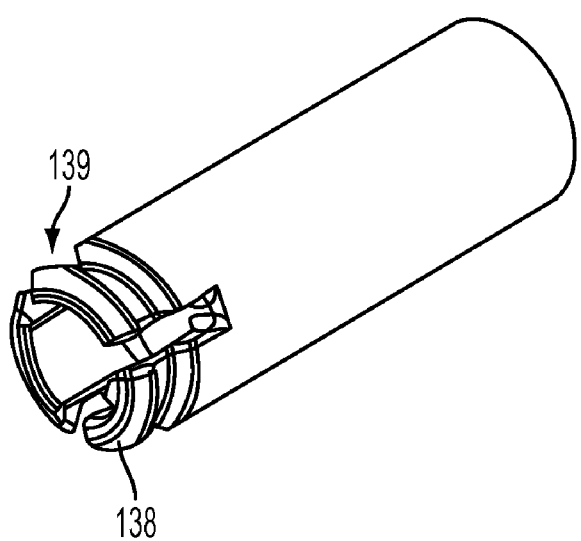
Figure 11:
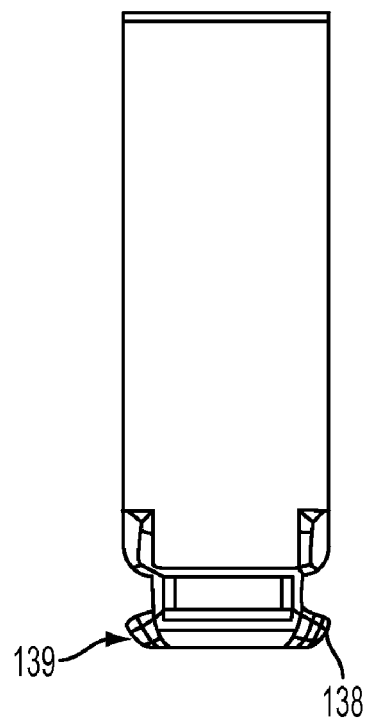

The drawings illustrate two practical examples of the invention. The drawings show the following:

FIG. 1 A front view of a link of a first practical example of a cable guide,

FIG. 2 A sectional view of two connected links along line A-A in FIG. 1,

FIG. 3 A view, corresponding to FIG. 2, of two links of the cable guide immediately before their assembly, FIG. 4 A perspective view of a first connecting pin, FIG. 5 A view of a detail of the fork-shaped connecting component with inserted pin, FIG. 6 A view corresponding to FIG. 5, where the individual parts are in a different position relative to each other, FIG. 7 A front view of a link of a second practical example of a cable guide, FIG. 8 The associated rear view, FIG. 9 A longitudinal section through the cable guide according to FIGS. 7 and 8, illustrating the insertion of the hinge pins to make a connection between two adjacent links, FIG. 10 A view corresponding to FIG. 9, showing the removal of the hinge pins to break the connection between two adjacent links, FIG. 11 A side view of a second connecting pin, FIG. 12 A perspective view of this connecting pin.

Cable guide 10 displays a plurality of links 12, which are connected to each other in articulated fashion in the manner of a chain, can each be angled virtually in all directions relative to each other, are open on the face end, and are provided with a shell section 14 that is of closed design, where appropriate, and has rotationally symmetrical external contours. The shell sections demarcate at least one guide channel 16, 17 for the cables, lines, etc. to be accommodated within the chain. Each link 12 is provided with a connecting element 18, which is connected to the respective shell section 14 via an essentially radial web 15 or the like, and displays two components 20, 22. First component 20 is designed as a fork with two legs 24, 26, both of which are provided with an opening 27, 28. Second component 22 displays an arm 23, which is provided with an opening 32, the boundary surface of which is spherical and forms a first seat for a joint element 34, which has a correspondingly spherical external boundary surface, is provided with a central, cylindrical bore 36, and whose axial extension corresponds to the distance between the two legs 24, 26.

Two adjacent links 12 are connected in that—starting from the position of the components shown in FIG. 3, for example—second connecting component 22 of the one link is inserted between the two legs of first connecting component 20 of the adjacent link in such a way that bores 27, 28 in the two legs 24 and 26 are aligned with bore 36 in joint element 34 of second connecting component 22, such that all bores 27, 28 and 36 form a second seat for a cylindrical pin 30, which can be inserted from the respective starting position shown in FIG. 3 into bore 27 in leg 24, and farther into the final position according to FIG. 2 in this second seat. This creates a virtually cardanic articulated connection between two adjacent links 12 of the cable guide, where the respective end areas of two adjacent links overlap each other, as illustrated in FIG. 2.

FIGS. 1 to 6 show a first embodiment of the means making the connection between two adjacent links 12. One end of cylindrical pin 30—the outside diameter of which is adapted to the inside diameter of bore 36 of joint element 34 of the second connecting component, retained between legs 24, 26, and to that of the bores in the two legs 24, 26 of the first connecting component—displays snap-in lugs 38, which project outwards beyond the contour of the cross-section of pin 30. Said snap-in lugs 38 are each located on the free end of a web 40. FIGS. 4 and 5 reveal that webs 40, which are integrally connected to pin 30, are, on the rear side, i.e. on the side of the pin facing away from the lateral surface of the pin, each assigned a clearance zone 46, into which the webs can be deflected when a force acting roughly radially inwards is applied to the snap-in lugs. Clearance zone 46 also permits slight lateral deflection of webs 40.

Opening 28 in second leg 26, which accommodates the end area of pin 30 provided with snap-in lugs 38, is provided with a wider cross-section 42 at its end facing away from first leg 24, said wider cross-section 42 being designed and positioned in such a way that its shorter axis corresponds to the diameter of opening 28, and its longer axis, perpendicular thereto, is larger than the diameter of opening 28 or the shorter axis of this ellipse-like wider cross-section 42 (cf. FIGS. 4 and 5).

When inserting pin 30 from the position shown in FIG. 3 into the seat formed by bores 27, 28 in the legs and bore 36 in joint element 34, snap-in lugs 38 are, owing to bevel 44 provided on their respective free end, and their elasticity, or that of webs 40 that bear them, forced inwards into the respective clearance zone 46 (FIG. 5) until the snap-in lugs are located within the circular contour of pin 30, thus not forming an obstacle in the form of a stop or the like during insertion into the second seat.

The depth of wider cross-section 42 parallel to the longitudinal axis of bore 42 roughly corresponds to the dimension of the snap-in lugs in the same direction. As a result of wider cross-section 42, a step is formed that has a stop face 48 lying perpendicular to the longitudinal axis of bore 28, and behind which snap-in lugs 38 reach when pin 30 assumes the corresponding angular position in its circumferential direction, in which snap-in lugs 38 are each located in the area of stop faces 48. In the practical example illustrated in the drawing, the snap-in lugs assume a position in which webs 40 that bear them are still under a certain degree of outwardly oriented prestress, such that the position of pin 30 is protected against longitudinal displacement by the positive connection existing between snap-in lugs 38 and stop face 48.

The other end of pin 30 is provided with a preferably continuous flange 49 (cf. FIGS. 2 and 4), which engages a corresponding wider area 50 on the side of bore 27 in leg 24 facing away from leg 26. The angular position in which pin 30 is inserted into the second seat, formed by the fork and joint element 34, is initially irrelevant because, owing to bevel 44 provided on their free ends, snap-in lugs 38 are displaced into clearance zone 46 anyway as a result of the inwardly oriented forces acting in a direction towards the longitudinal axis of the pins, until the outer edges of the snap-in lugs no longer project outwards beyond the contour of the pin or the cross-section of bores 27, 28 and 36. In this case, it must merely be ensured, at the end of the process of inserting pin 30 into this second seat, that the angular position of pin 30 is already set—or, if necessary, is then set by rotating the pin about its longitudinal axis—in such a way that the snap-in lugs are located in the region of stop face 48, formed by the wider cross-section, and thus move into this clearance zone under the action of the outwardly oriented elastic force, in order to bring about the positive connection with stop face 48.

To break the connection, it is merely necessary to turn the pin from the position pursuant to FIG. 5 into that shown in FIG. 6 in such a way that the snap-in lugs move into the peripheral area of wider cross-section 42 to which the shorter axis is assigned, the length of which corresponds to the diameter of bore 28 in leg 26. FIG. 6 reveals that, in the course of the rotary movement, the snap-in lugs are forced inwards, i.e. into the respectively associated clearance zone 46 (cf. FIG. 5), by the continuous wall bordering wider cross-section 42, thus being disengaged from stop face 48.

Both ends of pin 30 are provided with recesses 52, 54, which are not shown in FIGS. 5 and 6 and each display a corresponding cross-section, which can be engaged by a correspondingly shaped tool in order to rotate the pin into the respectively required position about its longitudinal axis.

Shell sections 14 of the individual links 12 are provided with corresponding openings 56, through which a tool can be inserted in order to turn pin 30 about its longitudinal axis in the necessary manner.

Owing to the elasticity of the interacting parts, joint element 34 can be retained in seat 32 by means of a snap connection, where pin 30, located within bore 36, secures this snap connection.

The second practical example, illustrated in FIGS. 7 to 12, corresponds to that in FIGS. 1 to 6 in essential respects. The reference numbers used for identical parts are therefore also identical, but 100 higher in each case.

One difference between the two embodiments is that connecting components 120, 122 of the second practical example are located in such a way, in relation to the longitudinal extension of web 115 bearing connecting elements 118, that the longitudinal axis of openings 127, 128 and 136 in the two connecting components, which form the seat for pin 130, lies essentially parallel to the longitudinal axis of web 115. The longitudinal axis of the latter constitutes a diameter of the cross-sectional area demarcated by the respective shell section 114. Accordingly, openings 156 in shell sections 114 of links 112, through which a tool 158 is inserted into the interior cross-sectional area of the respective link 112 for manipulating connecting pin 130, are arranged in such a way that they are oriented roughly coaxially to pin 130 in its active position and to the seat accommodating it, in order to make pin 130 accessible at both ends, be it for inserting the pin into its active position for making the connection between two adjacent links 112 (FIG. 9), or be it for breaking this connection by ejecting the pin from the seat formed by the two connecting components 120, 122 and arm 123 (FIG. 10). This arrangement of the connecting components, with corresponding arrangement of openings 156 for passing the tool through, has the advantage that the latter does not have to be moved through one of guide channels 116, 117, accommodating cables, lines or similar, in order to gain access to the pin when manipulating connecting pin 130. Rather, tool 158 can be moved along the web, i.e. in the area outside guide channels 116, 117, and thus outside the cables, etc. accommodated by them, in which context the web can, where appropriate, also act as a guide for the tool.

In the embodiment according to FIGS. 7 to 12, pin 130 is again provided with snap-in lugs 138, which are borne by webs 140. Here, too, the snap-in lugs and the webs can be integrally connected to the cylindrical pin. However, they are arranged and dimensioned in such a way that the divided ring 139 formed by snap-in lugs 138 displays a maximum diameter that need not be larger than that of the actual pin 130. FIGS. 9 and 10 reveal that a snap-in seat 160, forming a segment of a circle, is assigned to leg 126 of connecting component 120. Said snap-in seat 160 is adapted to the shape of the snap-in lugs, and the snap-in lugs snap into it in the active, final position of pin 130, shown at the bottom in FIG. 9. In the active, final position of pin 130, the snap-in lugs reach behind a ledge-shaped projection 162 that demarcates snap-in seat 160. The pin is secured in its position as a result. In the practical example illustrated in the drawing, this projection 162 is not present over the entire circumference of pin 130, because the pin seat is only present over part of the circumference in the end area of the pin, although it should advantageously extend over at least 180°. The fact that pin 130, with snap-in lugs 138 and the webs bearing them, is made of plastic offers the possibility, if and when necessary, of ejecting pin 130 from its seat effecting the connection between two adjacent links 112, e.g. in successive steps as indicated in FIG. 10, where, owing to the elasticity of the material, the snap-in lugs are displaced inwards, i.e. towards the longitudinal axis of the pin, and thus disengaged from the snap-in seat. In view of the fact that, when the pin is in its active, final position with engaged snap-in lugs, the pin is essentially only exposed to forces transverse to its longitudinal direction, the snap connection illustrated suffices to retain pin 130 in its active, final position, and thus to hold together the two connecting components of connecting element 118.

Pin 130 of the second practical example does not need a continuous flange on its end facing away from the snap-in lugs, as it is protected again displacement in both longitudinal directions when the snap-in lugs snap into snap-in seat 160.

Deviating from the practical example shown in the drawing, snap-in seat 160 can also be designed to extend continuously over more than 180°, in which context the snap-in lugs accordingly also engage the snap-in seat in distributed fashion over a larger area, or over the entire circumference, if appropriate. However, this is generally not necessary in view of the only slight forces acting on the pin in its longitudinal direction.

The individual links 12, 112 can be manufactured from plastic in one piece, apart from pin 30, 130 and joint element 34, 134, mounted in moveable fashion in arm 23, 123.

LIST OF REFERENCE NUMBERS

10 Cable guide
12 Link
14 Shell section
15 Web
16 Guide channel
17 Guide channel
18 Connecting element
20 Connecting component
22 Connecting component
23 Arm
24 Leg
26 Leg
27 Opening, bore
28 Opening, bore
30 Pin
32 Opening
34 Joint element
35 Boundary surface
36 Bore
38 Snap-in lug
40 Web
42 Wider cross-section
44 Bevel
46 Clearance zone
48 Stop face
49 Flange
50 Wider area
52 Recess
54 Recess
56 Opening
112 Link
114 Shell section
115 Web
116 Guide channel
117 Guide channel
118 Connecting element
120 Connecting component
122 Connecting component
123 Arm
124 Leg
126 Leg
127 Opening, bore
128 Opening, bore
130 Pin
134 Joint element
136 Bore
138 Snap-in lug
139 Divided ring
140 Web
156 Opening
158 Tool
160 Snap-in seat
162 Projection

What is claimed is:

1. Cable guide, consisting of links, connected to each other in articulated fashion, capable of angling in at least two directions relative to each other, and open on a face end, which are arranged behind each other in a longitudinal direction of the cable guide and form at least one guide channel by means of external guide elements, wherein a joint is located between two of the connected links within the cable guide, and wherein each of the two connected links has a corresponding connecting element having first and second connecting components, characterized in that the first connecting component of the connecting element is a fork-shaped design having two legs a distance apart from each other and each leg having an opening therein, and the second connecting component has a first seat having a spherical boundary surface and a joint element having an opening and a spherical outer boundary surface adapted to the spherical boundary surface of the first seat, wherein the joint element is mounted in the first seat in moveable fashion, and the second component having the joint element located therein can be positioned between the two legs of the first component in such a way that the opening in the joint element is aligned with the opening provided in each of the two legs of the first connecting component, such that a pin is insertable into a second seat formed by the openings in the two legs of the first component and the opening in the joint element of the second component, and is mounted in the second seat.

2. Cable guide according to claim 1, characterized in that the connecting elements of each of the two connected links are each on a mount that is connected to a shell section of the link.

3. Cable guide according to claim 2, characterized in that the each mount is designed as a web that extends essentially radially.

4. Cable guide according to claim 2, characterized in that each mount extends in a direction running essentially parallel to the pin.

5. Cable guide according to claim 2, characterized in that each mount has two ends and connected to the shell section at both of the ends.

6. Cable guide according to claim 1, characterized in that a first end of the pin is provided with elastically displaceable, snap-in projections that, in a mounted position of the pin, reach behind a stop face and protect the position of the pin from longitudinal displacement.

7. Cable guide according to claim 6, characterized in that the snap-in projections are manufactured with the remainder of the pin from plastic in one piece.

8. Cable guide according to claim 6, characterized in that the snap-in projections are located on free ends of elastically deformable webs which extend essentially parallel to a longitudinal axis of the pin and are integrally connected to the pin in such a way that the snap-in projections can be elastically displaced into an active position and an inactive position.

9. Cable guide according to claim 8, characterized in that the first component of the connecting element provides a seat for the snap-in projections into which the snap-in projections snap in an active, final position of the pin under an effect of an elastic restoring force of the webs.

10. Cable guide according to claim 9, characterized in that the snap-in seat for the snap-in projections is designed, and dimensioned in terms of depth, in such a way that the snap-in projections are disengaged from the snap-in seat under an effect of a force acting on the pin in a longitudinal direction of the pin, and the webs bearing snap-in projections are deformed in the process.

11. Cable guide according to claim 1, characterized in that the opening in at least one of the two legs of the first connecting component has, at an end facing away from the other leg, a wider cross-section that transitions, via a shoulder, into a section of the opening with a smaller cross-section.

12. Cable guide according to claim 11, characterized in that the wider cross-section of the opening in the one leg has an approximately elliptical cross-sectional shape, such that a shorter axis of the elliptical cross-sectional shape essentially corresponds to a diameter of the opening with the smaller cross-section in the leg, and accommodates the pin, and a longer axis of the elliptical cross-sectional shape, running perpendicular to the shorter axis of the elliptical cross-sectional shape, is larger than the diameter of the opening with the smaller cross-section, and snap-in projections are located around circumferential areas at an end of the pin in such a way that, in a mounted position of the pin, the snap-in projections are assigned to the section of the opening with a wider cross-section.

13. Cable guide according to claim 1, characterized in that an arm forms the first seat and at least areas of the arm forming the first seat, and at least areas of the joint element mounted in the first seat in moveable fashion, are made of plastic.

14. Cable guide according to claim 1, characterized in that each of the connected links has a shell section and the shell sections are provided with openings for passing through tools for manipulating the pin.

15. Cable guide according to claim 14, characterized in that the openings in the shell sections are circular openings arranged in such a way that the openings lie essentially on a longitudinal axis of the pin.

* * * * *